United States Patent [19]
Wada

[11] Patent Number: 5,727,402
[45] Date of Patent: Mar. 17, 1998

[54] AUTOMATIC WASHING MACHINE WITH IMPROVED RINSING ARRANGEMENT

[75] Inventor: Masatsugu Wada, Seto, Japan

[73] Assignee: Kabushiki Kaishi Toshiba, Kanagawa-Ken, Japan

[21] Appl. No.: 514,416

[22] Filed: Aug. 11, 1995

[30] Foreign Application Priority Data

Aug. 31, 1994 [JP] Japan ................... 6-207427

[51] Int. Cl.⁶ .................................................. D06F 39/08
[52] U.S. Cl. ................... 68/23.5; 68/23.7; 68/207
[58] Field of Search ................. 68/23.06, 23.1, 68/23.2, 23.3, 23.5, 23.7, 207

[56] References Cited

U.S. PATENT DOCUMENTS

| | | | |
|---|---|---|---|
| 1,724,234 | 8/1929 | Thomas | 68/23.5 |
| 2,023,013 | 12/1935 | Faber et al. | 68/23.5 |
| 2,101,634 | 12/1937 | Aldridge | 68/23.5 |
| 2,588,535 | 3/1952 | Kahn | 68/23.1 |
| 4,411,664 | 10/1983 | Rickard et al. | 68/12.06 |
| 5,074,131 | 12/1991 | Hirose et al. | 68/23.1 |

FOREIGN PATENT DOCUMENTS

| | | | |
|---|---|---|---|
| 498318 | 1/1951 | Belgium | 68/23.5 |
| 60079 | 9/1954 | France | 68/23.5 |
| 1081409 | 5/1960 | Germany | 68/23.7 |
| 57-54159 | 11/1982 | Japan | D06F 33/02 |
| 57-202889 | 12/1982 | Japan | D06F 39/08 |
| 2-45479 | 10/1990 | Japan | D06F 37/26 |
| 433175 | 9/1967 | Switzerland | 68/23.1 |
| 875186 | 8/1961 | United Kingdom | 68/23.3 |

*Primary Examiner*—Frankie L. Stinson
*Attorney, Agent, or Firm*—Limbach & Limbach, LLP

[57] ABSTRACT

A full automatic washing machine includes an outer tub having an upper opening, a rotatable tub mounted in the outer tub for rotation, and an agitator mounted in the rotatable tub for rotation. The rotatable tub has a number of dehydrating holes formed only in the upper end of its circumferential wall. An inner lid is pivotally mounted on an outer tub cover so as to open and close the upper opening of the outer tub. The inner lid has a concave showering portion having a number of showering through holes. In a wash step, the agitator is driven with the inner lid closed. In a rinse-with-dehydration step, supply of water via the showering holes of the inner lid into the rotatable tub and rotation of the rotatable tub are alternately executed under sequential control of these steps.

12 Claims, 10 Drawing Sheets

| STEP | WATER-SUPPLY | WASH | DRAINING | FIRST DEHYDRATION | WATER-SUPPLY | FIRST RINSE | DRAINIG | SECOND DEHYDRATION | WATER-SUPPLY | SECOND RINSE | DRAINING | FINAL DEHYDRATION | TOTAL |
|---|---|---|---|---|---|---|---|---|---|---|---|---|---|
| FIRST PRIOR ART WASHING MACHINE OF THE TWO-TUB TYPE WITHOUT INNER LID — TIME (MIN.) | 4.0 | 12.5 | 2.4 | 3.3 | 3.7 | 2.5 | 2.4 | 3.3 | 3.7 | 3.8 | 2.4 | 8.3 | 52.3 |
| QUANTITY OF WATER (LIT.) | 60 | | | | 55 | | | | 55 | | | | 170 |

FIG. 6B

AUTOMATIC WASHING MACHINE WITH IMPROVED RINSING ARRANGEMENT

BACKGROUND OF THE INVENTION

1. Field of the Invention

This invention relates to automatic washing machines provided with a rotatable tub, and more particularly to such an automatic washing machine in which the rotatable tub is rotated at high speeds with water being supplied into the tub so that a rinse-with-dehydration operation is executed.

2. Description of the Prior Art

Conventional full automatic washing machines are roughly classified into a single tub type and a two-tub type depending upon the number of tubs receiving supplied water. The full automatic washing machine of the single tub type comprises an outer tub, a substantially imperforate rotatable tub provided in the outer tub, and an agitator mounted in the rotatable tub. The diameter of the rotatable tub is gradually increased from its lower side to its upper side. The agitator is driven with water being stored only in the rotatable tub in a wash step. In a dehydration step, water is discharged out of the rotatable tub, and subsequently, the rotatable tub is rotated at a high speed so that a resultant centrifugal force causes water to be extracted from laundry and then to rise up along an inner circumferential wall of the rotatable tub to an upper open end thereof. The water is discharged via the upper open end of the rotatable tub into the outer tub.

The full automatic washing machine of the two-tub type comprises a water-receiving tub, a bottomed cylindrical rotatable tub provided in the water-receiving tub, and an agitator mounted in the rotatable tub. The rotatable tub has a number of dehydrating holes in a circumferential wall thereof. In the wash step, water is stored both in the rotatable tub and in the water-receiving tub communicating through the dehydrating holes with the rotatable tub. The agitator is driven in this condition. In the dehydration step, the water is discharged out of the water-receiving and rotatable tubs, and subsequently, the rotatable tub is rotated at a high speed so that water is centrifugally extracted from laundry and then discharged through the dehydrating holes into the water-receiving tub.

Reductions in a quantity of water used and in a period of time for the washing have recently been desired in the full automatic washing machines. A solution to this problem depends upon how a quantity of water and a period of time required for each of the wash and rinse steps are reduced.

However, the conventional single tub type full automatic washing machine employs, as a rinse mode, an overflow rinse wherein water is stored in the imperforate rotatable tub, and subsequently, the agitator is driven with the supply of water being continued. Accordingly, the rinsing operation requires a large quantity of water and a long period of time. Furthermore, the two-tub type full automatic washing machine employs, as the rinse mode, a stored-water rinse wherein the agitator is driven with the water being stored in the water-receiving and rotatable tubs. This rinse mode also requires a large quantity of water and a long period of time.

Publication No. 57-202889 (1982) of Japanese unexamined utility model registration application discloses an improved two-tub type full automatic washing machine. In the disclosed washing machine, an inner lid is provided so as to be capable of showering water over the whole upper area of the water-receiving tub. Water is supplied via the inner lid into the rotatable tub after the draining of the rotatable tub and after an intermediate dehydration prior to the rinse operation, so that the water soaks into the laundry. Thereafter, the rotatable tub is rotated at a high speed with the above-described water supply being continued, whereby a so-called rinse-with-dehydration mode is executed. However, the rotatable tub has a number of dehydrating holes formed in the circumferential wall thereof, and accordingly, large part of the water supplied via the inner lid flows out through the dehydrating holes without soaking into the laundry. Thus, a sufficient rinsing effect cannot be achieved, and consequently, a large quantity of water is required.

SUMMARY OF THE INVENTION

Therefore, an object of the present invention is to provide an automatic washing machine wherein a quantity of water and a period of time required for the rinse operation can be reduced.

The present invention provides an automatic washing machine comprising an outer tub having an upper opening, a tub rotatably provided for rotation about a vertical axis in the outer tub and having a circumferential wall formed with a dehydrating hole only in an upper portion thereof so that the rotatable tub is substantially imperforate, and an agitator provided in the rotatable tub. An inner lid is provided so as to open and close the upper opening of the outer tub. The inner lid has a showering hole formed in a predetermined portion thereof. Water-supply means is provided for supplying water to the inner lid so that the water is showered from the showering hole of the inner lid into the rotatable tub. Control means is provided for sequentially executing a wash step by driving the agitator under the condition that the inner lid closes the upper opening of the outer tub, and a rinse-with-dehydration step including the supply of water to the inner lid by the water-supply means so that the water is showered into the rotatable tub, and rotation of the rotatable tub so that the water is centrifugally extracted from laundry.

According to the above-described washing machine, water is supplied via the showering hole of the inner lid into the rotatable tub and the rotatable tub is rotated so that a rinse-with-dehydration step is executed. The water sufficiently soaks into laundry, and the centrifugal force due to rotation of the rotatable tub discharges the water with detergent component via the dehydrating hole of the rotatable tub. A quantity of water and a period of time required for this rinse-with-dehydration step can be reduced as compared with those in the prior art stored-water rinse mode and the overflow rinse mode. Since the rotatable tub has the dehydrating hole only in the upper end portion thereof, almost all the water supplied into the rotatable tub soaks into the laundry. Consequently, a high level of water soaking efficiency can be achieved, and accordingly, the quantity of water and the period of time required for the rinse-with-dehydration step can also be reduced as compared with those in the prior art two-tub type full automatic washing machine in which the rinse-with-dehydration step is executed.

Furthermore, since water is stored only in the rotatable tub in a wash step, a quantity of water used in the wash step can also be reduced. The upper opening of the outer tub is closed by the inner lid during the wash step. Accordingly, the water can be prevented from splashing out of the outer tub even when splashing during the wash step.

The above-described washing machine may further comprise suspension means mounted on a stationary member of the machine for resiliently suspending the outer tub at a stationary member such as an outer cabinet of the machine.

The rotatable tub is caused to swing to some extent during the rinse-with-dehydration step. Since the outer tub is moved with the rotatable tub, the position of the inner lid or the showering holes thereof relative to the rotatable tub is unchanged. Consequently, the water is usually supplied to predetermined locations in the rotatable tub, which results in better soaking of water into the laundry and does not bring about reduction in the effects of the rinse-with-dehydration.

The agitator preferably performs an intensified mode of agitating operation. The mode is intenser than a conventional normal mode of agitating operation. It is considered that the intensified mode of agitating operation would cause the water to splash out of the outer tub and produce noise. However, since the inner lid is provided so as to close and open the upper opening of the outer tub, the splashing of the water and the noise can be prevented.

The washing machine may further comprise an inner basket formed into a cylindrical shape and disposed in close vicinity of an inner circumferential face of the rotatable tub to be prevented from rotation relative to the rotatable tub. The inner basket has a number of water-passing holes or dehydrating holes formed in a circumferential wall thereof. Water flow paths are defined between the inner circumferential face of the rotatable tub and the inner basket. Consequently, the laundry can be prevented from closely adhering to the inner circumferential face of the rotatable tub during the dehydrating step, which results in improvement of the dehydrating performance. Furthermore, since the draining can be smoothly performed, the draining performance can also be improved. Additionally, the rotatable tub has a double wall structure as the result of provision of the inner basket. The strength of the rotatable tub can be improved, and accordingly, the rotatable tub can sufficiently withstand the high speed rotation in the dehydration step. Consequently, the dehydrating performance can be further improved.

The diameter of the rotatable tub is preferably larger at the upper end side than at the lower end side thereof, whereupon the draining can be smoothly performed.

The showering hole may be formed in a portion of the inner lid in the vicinity of the circumference of the rotatable tub. The control means may control the water-supply means and the rotatable tub so that water supply via the showering hole of the inner lid into the rotatable tub and rotation of the rotatable tub are executed in the rinse-with-dehydration step. The water falls via the showering hole onto the laundry which has been pushed against the inner circumferential face of the rotatable tub due to rotation thereof. Consequently, the water soaking efficiency can be further improved, and accordingly, the performance in the rinse-with-dehydration can be improved.

The water supply via the showering hole of the inner lid into the rotatable tub and rotation of the rotatable tub may be alternately repeated in the rinse-with-dehydration step.

BRIEF DESCRIPTION OF THE DRAWINGS

Other objects, features and advantages of the present invention will become clear upon reviewing the following description of preferred embodiments thereof, made with reference to the accompanying drawings, in which:

FIGS. 6A, 6B, and 6C are time charts showing the control contents for the washing machine of the embodiment and two prior art washing machines;

DETAILED DESCRIPTION OF THE PREFERRED EMBODIMENTS

Figure 1:
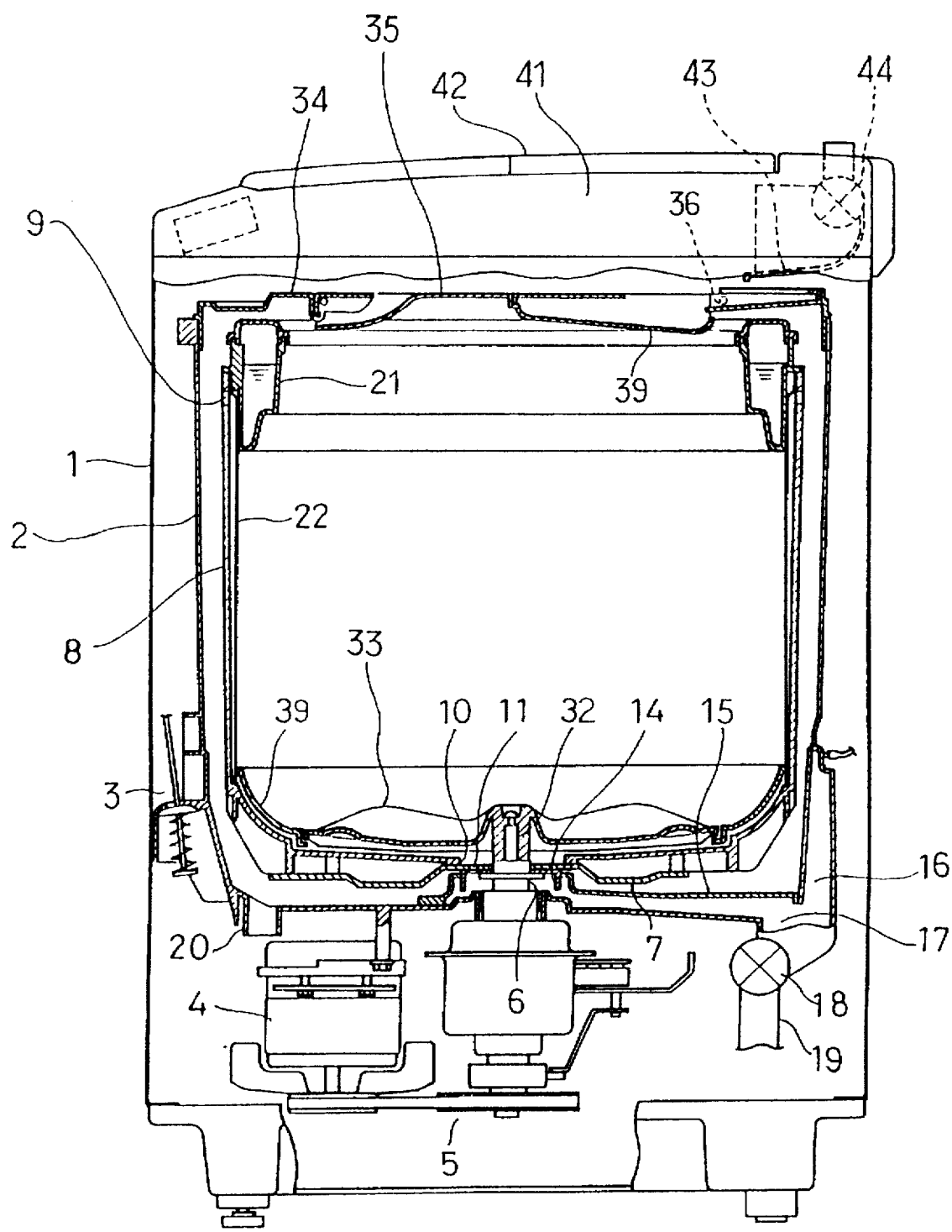
FIG. 1 is a longitudinally sectional side view of a full automatic washing machine of one embodiment in accordance with the present invention.

One embodiment of the present invention will be described with reference to the accompanying drawings. Referring to FIG. 1, an overall full automatic washing machine of the embodiment is shown. The washing machine comprises an outer cabinet 1 and an outer tub 2 resiliently mounted on a plurality of suspension means 3 (one of them being shown) which are further mounted on the outer cabinet 1 serving as a stationary member. A drive mechanism 5 including an electric motor 4 is provided below the outer tub 2. The drive mechanism 5 further includes a dehydration shaft 6 which is rotated in a dehydration step. The dehydration shaft 6 extends through the bottom of the outer tub 2 thereinto. A tub-mounting disc 7 is mounted to the upper end of the dehydration shaft 6.

Figure 2:
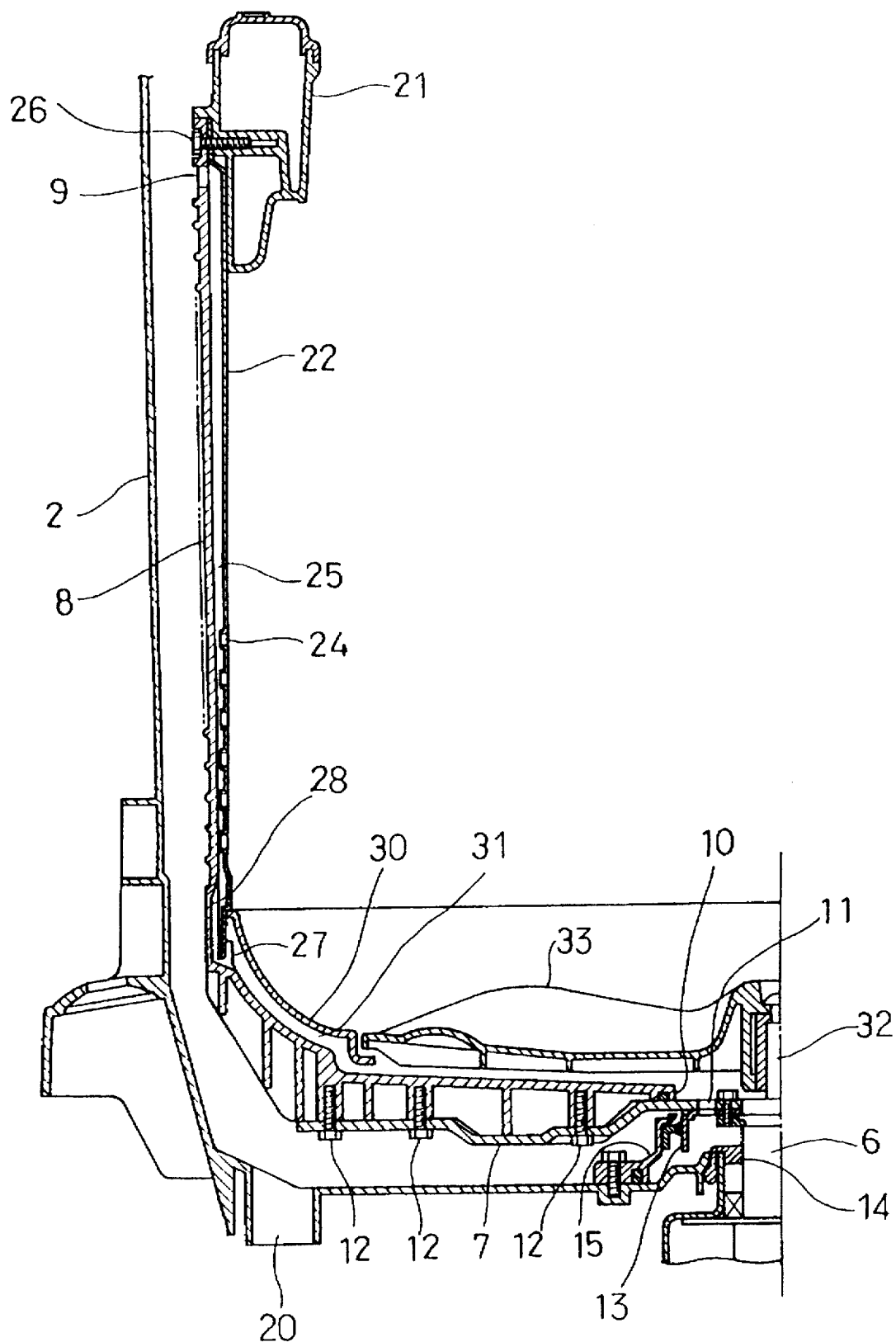
FIG. 2 is a partial enlarged longitudinal section of a rotatable tub employed in the washing machine.

A rotatable tub 8 made of a plastic material is rotatably mounted in the outer tub 2. The diameter of the rotatable tub 8 is larger at the upper end side thereof than at the lower end side thereof. The rotatable tub 8 has a number of dehydrating through holes 9 formed in a row in the upper end portion of a circumferential wall thereof, as shown in FIG. 2. The rotatable tub 8 further has a drain hole 10 formed in the central bottom thereof. The rotatable tub 8 is placed on the tub-mounting disc 7 such that the drain hole 10 lies on a plurality of water-passing holes 11 formed in the central portion of the disc 7. The rotatable tub 8 is then secured to the disc 7 by a plurality of screws 12. The water-passing holes 11 of the tub-mounting disc 7 communicate via a seal metal 13, a seal 14, and a duct 15 with a first drain hole 17 which is adjacent to a water-level detecting air trap 16 provided at the outer tub 2 as shown in FIG. 2. The air trap 16 and the first drain hole 17 communicate via a drain valve 18 with a drain hose 19 as shown in FIG. 1. The outer tub 2 has a second drain hole 20 formed in its portion outside the cover 15 (the left-hand bottom thereof as viewed in FIG. 2). The second drain hole 20 communicates directly with the drain hose 19 although the communication is not shown.

Figure 3:
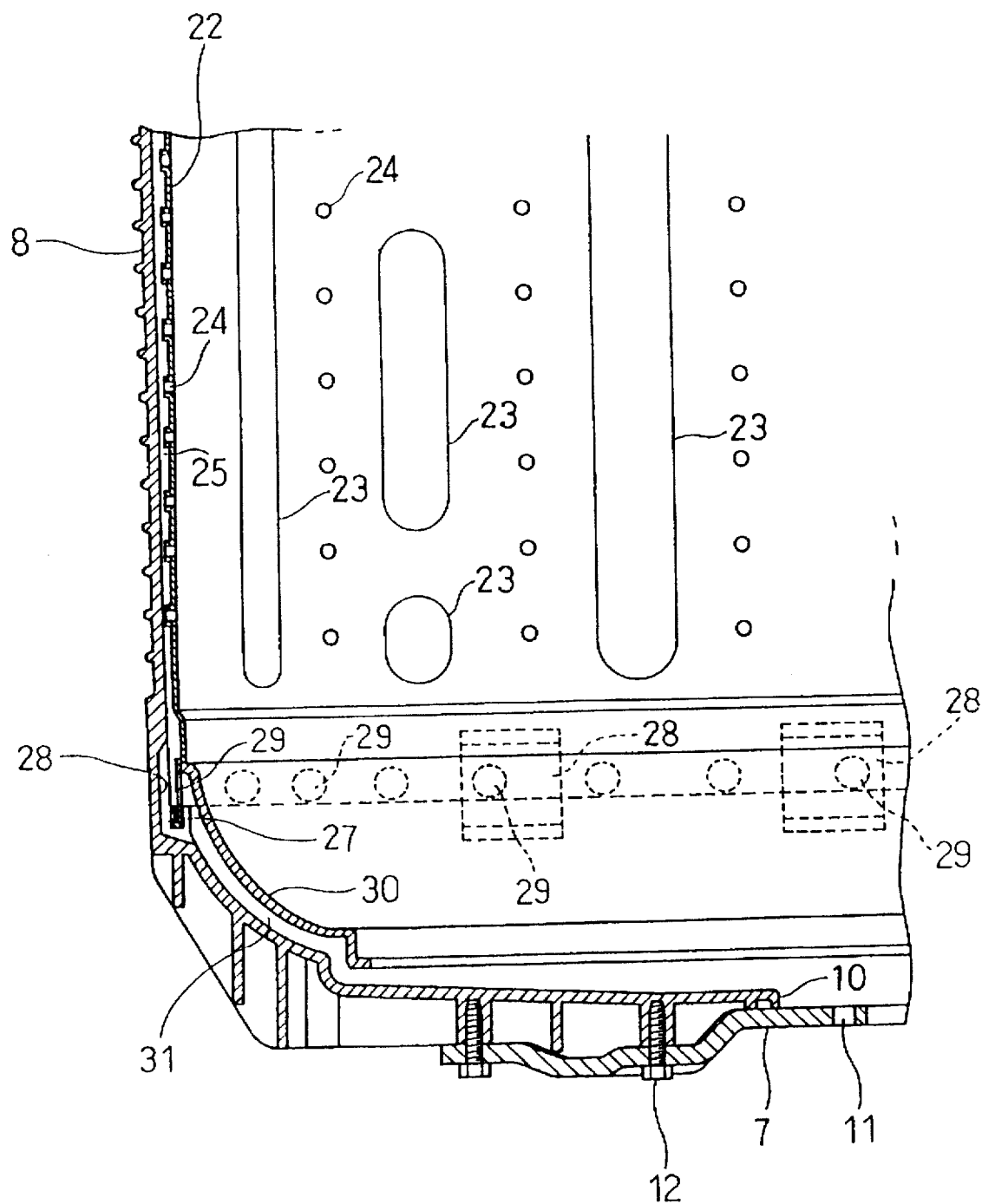
FIG. 3 is an enlarged longitudinal section of the lower part of the rotatable tub.
Figure 4:
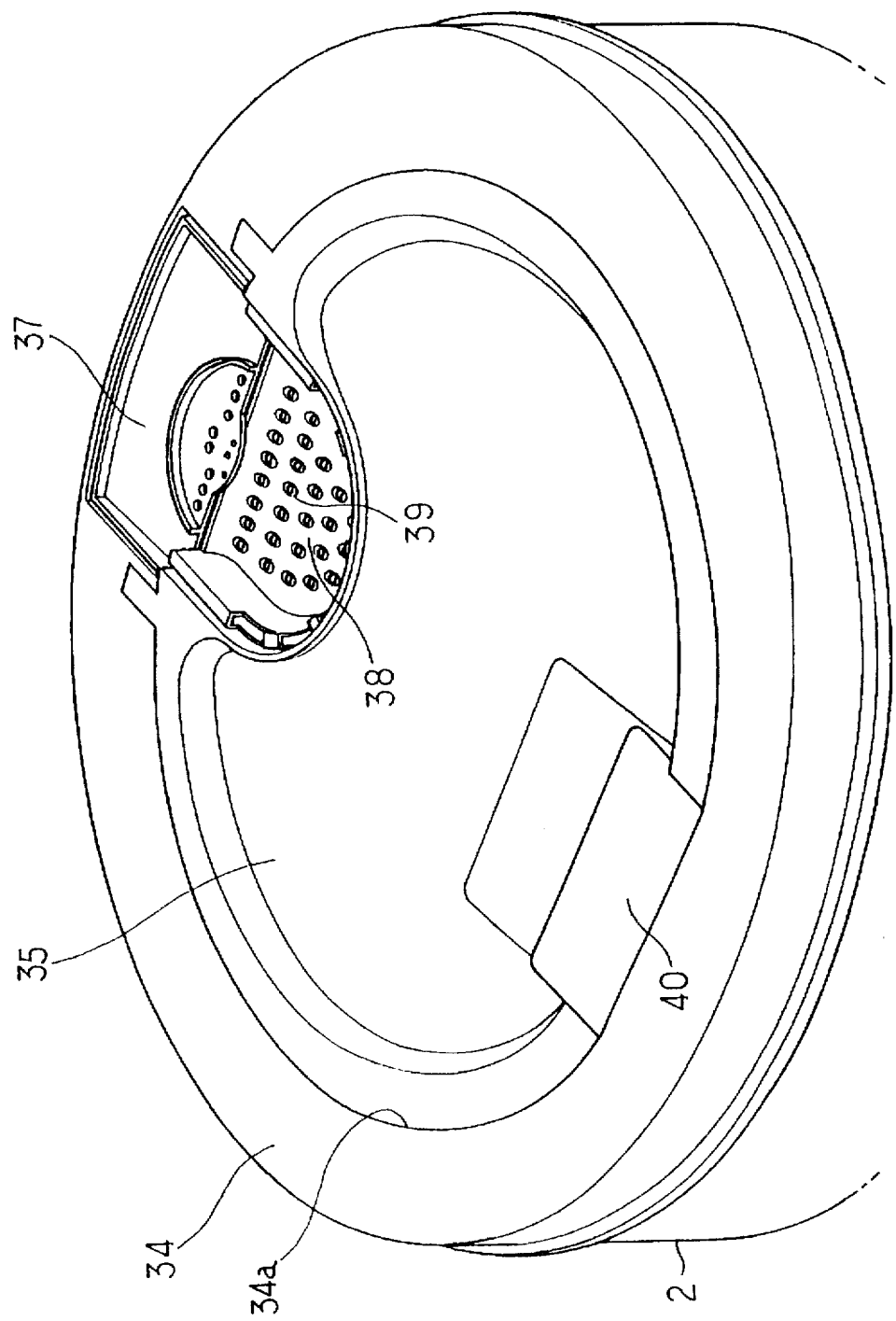
FIG. 4 is a perspective view of an outer tub cover and an inner lid.

A liquid-in balancing ring 21 is mounted to the upper portion of the rotatable tub 8. An inner basket 22 is provided in the rotatable tub 8 as shown in FIGS. 1 to 3. The inner basket 22 is made of a metal and more specifically, the inner basket 22 is formed by rounding a stainless steel plate and connecting both ends together by means of caulking. The inner basket 22 is formed into such a cylindrical shape that the diameter thereof is substantially the same from the lower end to the upper end thereof or that the diameter thereof is smaller at the upper end side than at the lower end side thereof. The inner basket 22 has several forms of expanding portions 23 each expanding outwardly from the circumferential wall thereof. The inner basket 22 further has a number of water-passing through holes 24 formed in the portion of the circumferential wall thereof other than the expanding portions 23.

The inner basket 22 is disposed in close vicinity to the inner circumferential surface of the rotatable tub 8 such that the expanding ends of the expanding portions 23 abut against the inner circumferential surface of the rotatable tub 8. Consequently, a space 25 is defined between the inner circumferential surface of the rotatable tub 8 and the outer circumferential surface of the inner basket 22. The upper end of the inner basket 22 is secured by screws 26 to the upper portion of the rotatable tub 8 immediately over the dehydrating holes 9 together with the balancing ring 21. On the other hand, the lower end of the inner basket 22 is fitted into a fitting groove 27 formed in the lower portion of the rotatable tub 8.

The rotatable tub 8 has a water-passing concavity 28 formed in the lower inner circumferential wall thereof. The water-passing concavity 28 provides for water flow paths between the rotatable tub 8 and the inner basket 22. The inner basket 22 has a number of water-passing holes 29 formed in the lower end thereof. A bottom cover 30 made of a plastic material extends from the lower end of the inner basket 22 toward the drain hole 10 of the rotatable tub 8. The bottom cover 30 is discrete from the inner basket 22. The bottom cover 30 is secured to the bottom of the rotatable tub 8 by a plurality of screws (not shown) so that a space 31 is defined between the bottom cover 30 and the bottom surface of the rotatable tub 8. The space 25 between the rotatable tub 8 and the inner basket 22 communicates with the drain hole 10 via the space 31. A wash shaft 32 which is rotated in a wash step is inserted in the dehydration shaft 6. The upper end of the wash shaft 32 extends through the bottom of the rotatable tub 8. An agitator 33 is secured to the extended upper end of the wash shaft 32.

A flat ring-shaped outer tub cover 34 is attached to the top of the outer tub 2. An inner lid 35 is pivotally mounted on a shaft 36 provided in the rear of the cover 34, thereby closing and opening an opening 34a of the cover 34 at the upper opening of the outer tub 2. The cover 34 has a water receiving portion 37 formed in the rear thereof. The inner lid 35 has a concave showering portion 38 formed in a predetermined portion thereof, for example, a circumferential rear portion thereof. The showering portion 38 has a number of showering holes 39. The inner lid 35 also has an operating handle 40 provided on the front thereof.

Referring further to FIG. 1, a top cover 41 is attached to a top of the outer cabinet 1. The top cover 41 has a central opening closed and opened by an outer lid 42. A detergent storage 43 and a water-supply valve 44 serving as water-supply means are provided inside the top cover 41 so as to be disposed rearwardly over the water receiving portion 37 of the cover 34.

Figure 5:
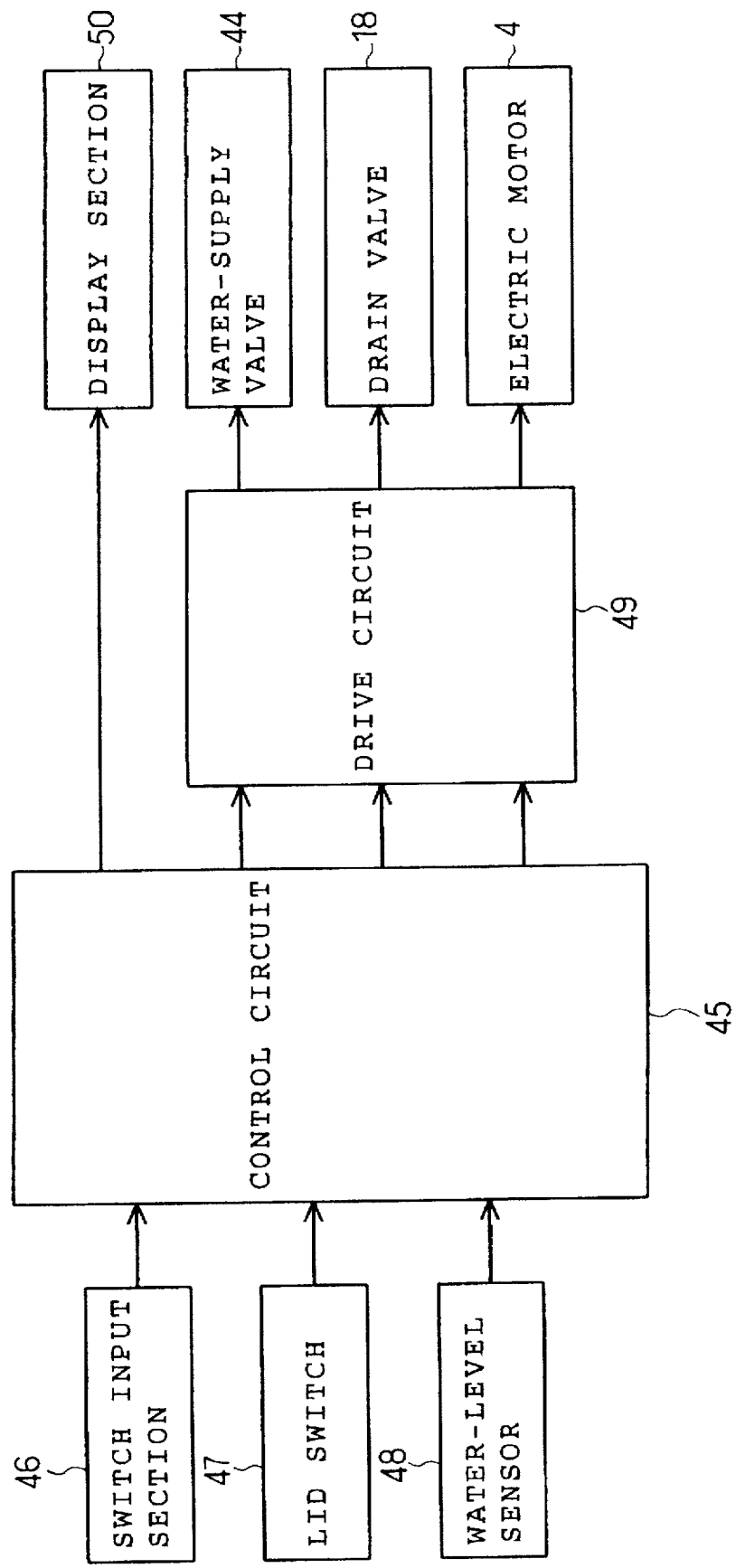
FIG. 5 is a block diagram showing an electrical arrangement of the washing machine.

An electrical arrangement of the washing machine will now be described. Referring to FIG. 5, a control circuit 45 serving as control means comprises a microcomputer and various analog-to-digital (A/D) converters. A switch input section 46 is provided in an operation panel (not shown). Switch signals are supplied from the switch input section 46 to the control circuit 45. A lid switch 47 responds to the opening and closure of the outer lid 42, thereby generating a lid signal, which is supplied to the control circuit 45. A water level sensor 48 is provided for sensing the water level in the rotatable tub 8, thereby generating a water-level signal, which is also supplied to the control circuit 45. Based on the above-described input signals and a previously stored control program, the control circuit 45 controls the water-supply valve 21, the motor 4, and the drain valve 18 via a drive circuit 49. The control circuit 45 further controls a display section 50 provided in the operation panel.

Figure 6A:
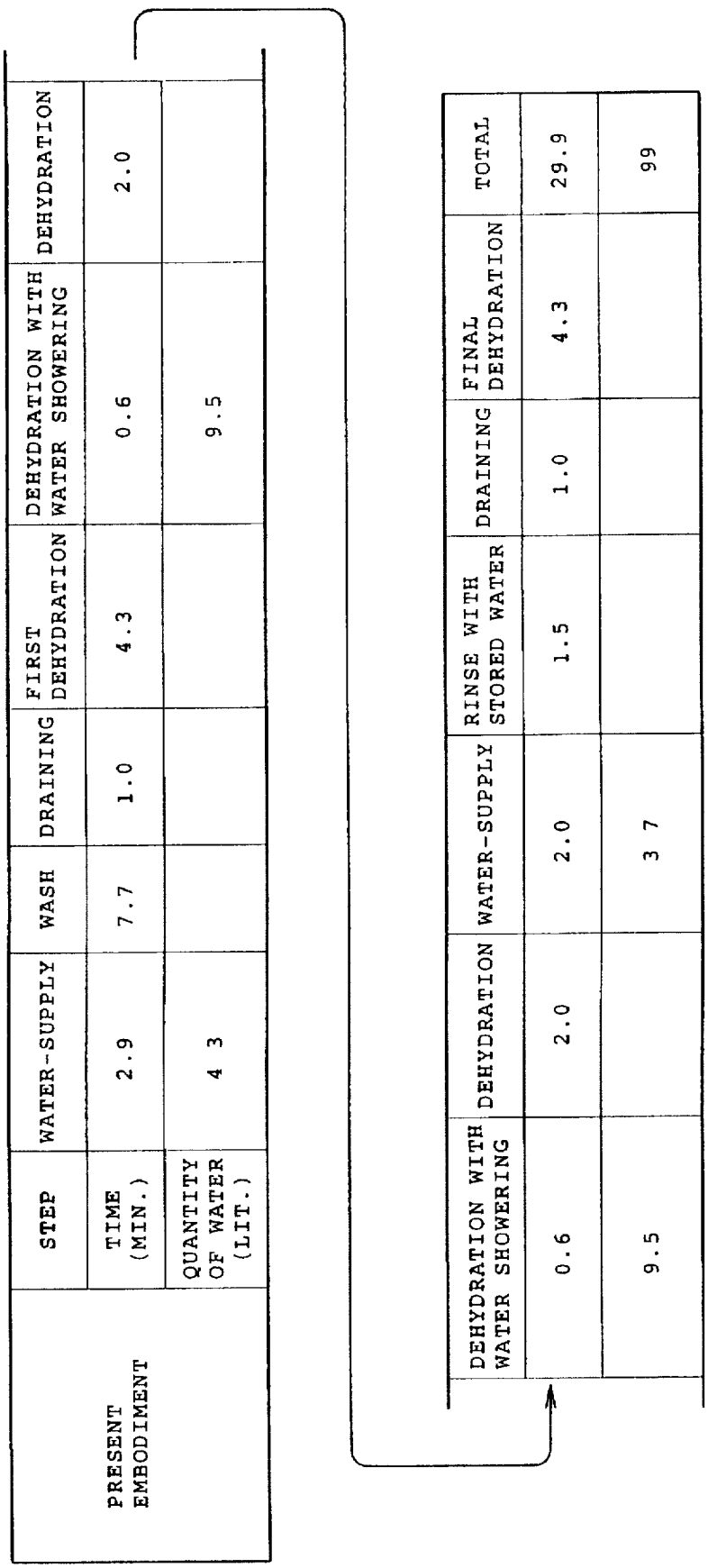

The control circuit 45 sequentially controls a wash step including a washing operation with detergent and a rinsing operation, a rinse-with-dehydration step, and other steps. For example, an AUTOMATIC COURSE under rated load includes steps of WATER-SUPPLY, WASH (with detergent), DRAIN, FIRST DEHYDRATION, DEHYDRATION WITH WATER SHOWERING, DEHYDRATION, DEHYDRATION WITH WATER SHOWERING, DEHYDRATION, WATER-SUPPLY, STORED-WATER RINSE, DRAIN, and FINAL DEHYDRATION, as shown in FIG. 6A. The control circuit 45 controls these steps so that they are automatically carried out sequentially. The control contents of each step is as follows.

WATER-SUPPLY

The water-supply valve 44 is opened until the water level detected by the water-level sensor 48 reaches 43 liters. Water is stored in the rotatable tub 8, whereas it is not stored in the outer tub 2.

WASH (with detergent)

The agitator 33 is driven, with the inner lid 35 closed, in a manner as shown in the following TABLE 1. The motor 4 is turned on for 1.7 seconds and turned off for 0.9 seconds alternately repeatedly when the water-level is set at HIGH (43 liters, for example). The motor 4 is turned on for 1.2 seconds and turned off for 0.8 seconds alternately repeatedly when the water-level is set at MIDDLE. The motor 4 is turned on for 0.8 seconds and turned off for 0.8 seconds alternately repeatedly when the water-level is set at LOW. The mode of the agitation is intensified as compared with that of the prior art full automatic washing machine as shown in TABLE 1. Laundry is agitated with water by means of the intensified agitating operation in the WASH (with detergent) step.

TABLE 1

| | Agitating operation | | | |
|---|---|---|---|---|
| | Present embodiment | | Prior art (single tub type) | |
| Water-level | ON | OFF | ON | OFF |
| HIGH | 1.7 sec. | 0.9 sec. | 1.2 sec. | 0.9 sec. |
| MIDDLE | 1.2 sec. | 0.8 sec. | 1.0 sec. | 0.9 sec. |
| LOW | 0.8 sec. | 0.8 sec. | 0.9 sec. | 1.2 sec. |

DRAIN

The drain valve 18 is opened for a predetermined period of time, for example, one minute. The water in the rotatable tub 8 is discharged through the drain hole 10, the duct 15, and the drain hose 19. The discharged water includes the water within the inner basket 22 and the water between the inner basket 22 and the rotatable tub 8. Since the space 25 serving as the water-passing path is defined between the inner circumferential face of the rotatable tub 8 and the inner basket 22, the draining can be carried out smoothly with the result of improvement in the draining performance. Furthermore, since the diameter of the rotatable tub 8 is gradually increased from the lower end side thereof to the upper end side thereof, the draining can be carried out further smoothly.

FIRST DEHYDRATION

The rotatable tub 8 is rotated at a high speed for a predetermined period of time, for example, 4.3 minutes. In this case, too, provision of the space 25 prevents the laundry from closely adhering to the inner circumferential face of the tub 8. Accordingly, the water extracted from the laundry is desirably caused to rise up along the inner circumferential face of the tub 8 to be thereby discharged through the dehydrating holes 9 into the outer tub 2.

DEHYDRATION WITH WATER SHOWERING and DEHYDRATION in a first rinse-with-dehydration These steps constitute the rinse-with-dehydration step. In the DEHYDRATION WITH WATER SHOWERING, the water-supply valve 44 is energized to be opened and the motor 4 is driven to rotate the rotatable tub 8 at a low speed (100 rpm, for example). The DEHYDRATION WITH WATER SHOWERING is executed for 0.6 minutes. In the DEHYDRATION, the water-supply valve 44 is deenergized and the motor 4 is driven to rotate the rotatable tub 8 at a high speed (1,000 rpm, for example). The DEHYDRATION is executed for 2 minutes. These steps are executed twice alternately.

In each step of DEHYDRATION WITH WATER SHOWERING, the water is showered via the showering holes 39 of the inner lid 35 into the rotatable tub 8 such that the water soaks into the laundry in the tub 8. The rotatable tub 8 is rotated at the high speed in the subsequent step of DEHYDRATION, so that the water is extracted from the laundry. Consequently, the detergent is effectively removed from the laundry.

The rotatable tub 8 swings to some extent during the rinse-with-dehydration step. However, since the outer tub 2 is resiliently suspended on the suspension means 3 together with the rotatable tub 8, the outer tub 2 is moved with the rotatable tub 8. Accordingly, the position of the inner lid 35 or the showering holes 39 thereof relative to the rotatable tub 8 is unchanged. Consequently, the water is usually supplied to predetermined locations in the rotatable tub 8, which results in better soaking of water into the laundry and does not bring about reduction in the effects of the rinse-with-dehydration.

Second rinse-with-dehydration including WATER-SUPPLY and STORED-WATER RINSE, and DRAIN

WATER-SUPPLY:

The water-supply valve 44 is opened until the water level detected by the water-level sensor 48 reaches 37 liters.

STORED-WATER RINSE

The agitator 33 is driven according to TABLE 1 in the same manner as in the WASH step.

DRAIN

The water is drained from the rotatable tub 8 in the same manner as in the above-described DRAIN step subsequent to the WASH step.

FINAL DEHYDRATION

The water is extracted from the laundry and discharged into the outer tub 2 in the same manner as in the above-described FIRST DEHYDRATION step.

Figure 7:
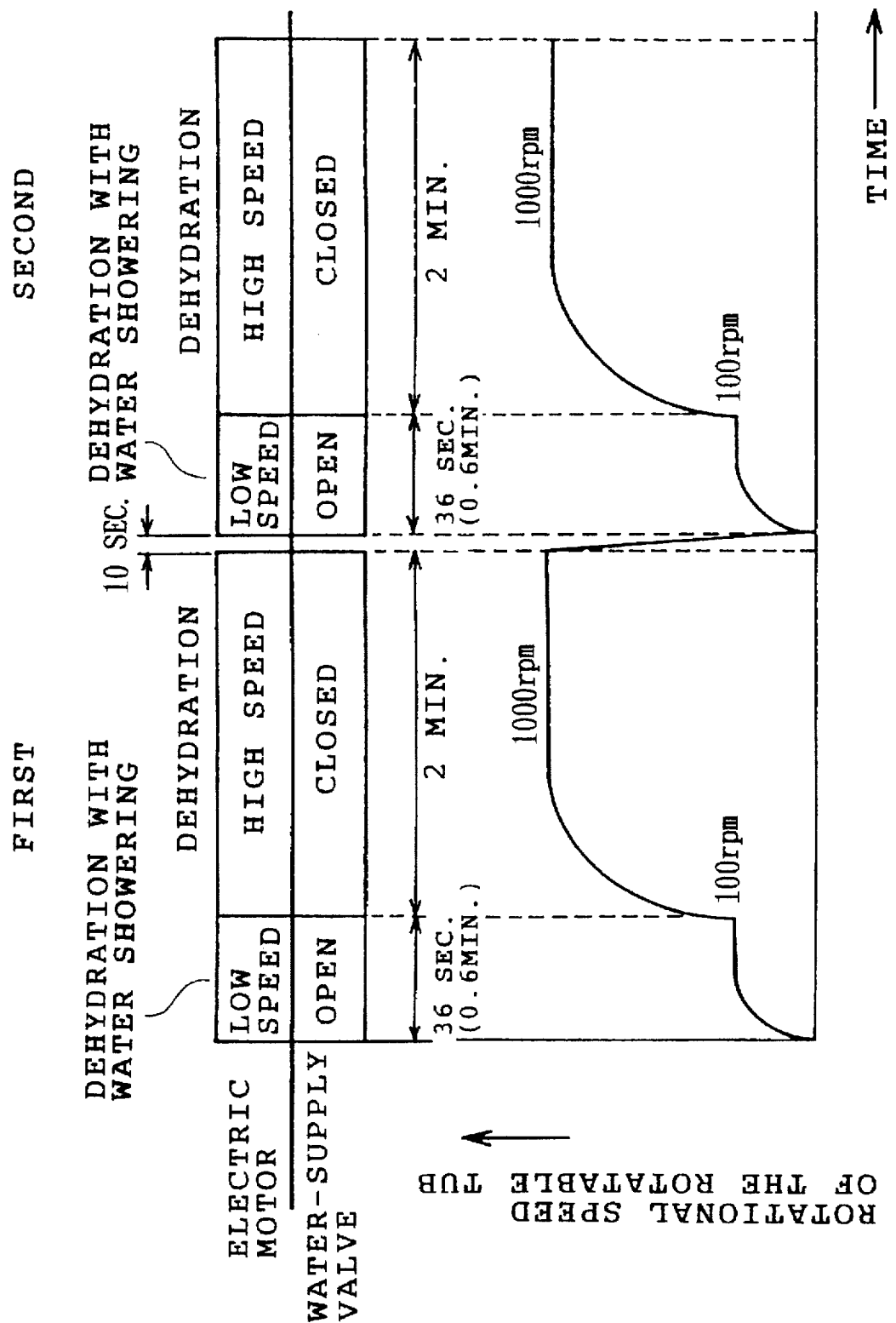
FIG. 7 shows the relationship among the motor speed, the mode of a water-supply valve, and the rotational speed of the rotatable tub.

Referring to FIG. 7, a period of time between the completion of the first rinse-with-dehydration and the start of the second rinse-with-dehydration is set at about 10 seconds. For this purpose, the rotatable tub 8 is braked when the first rinse-with-dehydration has been completed.

According to the above-described embodiment, water is stored, in the wash step, only in the rotatable tub 8 which has the dehydrating holes 9 only in the upper end portion of the circumferential wall thereof. Thus, a quantity of water used can be reduced. Furthermore, the upper opening of the outer tub 2 is closed by the inner lid 35 in the wash step. Accordingly, even when the wash splashes in the rotatable tub 8 during the wash step, the water can be prevented from splashing out of the outer tub 2. The following TABLE 2 shows an amount of water splashing out of the outer tub:

TABLE 2

| An amount of water splashing out of the outer tub | | |
|---|---|---|
| Present embodiment | Prior art two-tub type with inner lid | Prior art single tub type |
| 0 cc | 0 cc | 20 cc |

The rotatable tub 8 is rotated with water being supplied thereto via the showering holes 39 of the inner lid 35, whereby the rinse-with-dehydration step is executed. Consequently, the water soaks into the laundry sufficiently, and the water extracted from the laundry and containing detergent is drained through the dehydrating holes 9 from the rotatable tub 8 by the centrifugal force due to rotation of the tub 8. Consequently, a quantity of water and a period of time for the rinsing can be reduced as compared with the prior art stored-water rinse or rinse with water showering. The quantity of water used can be reduced even when the above-described rinse-with-dehydration is executed in combination with the prior art stored-water rinse or rinse with water showering.

Figure 6C:
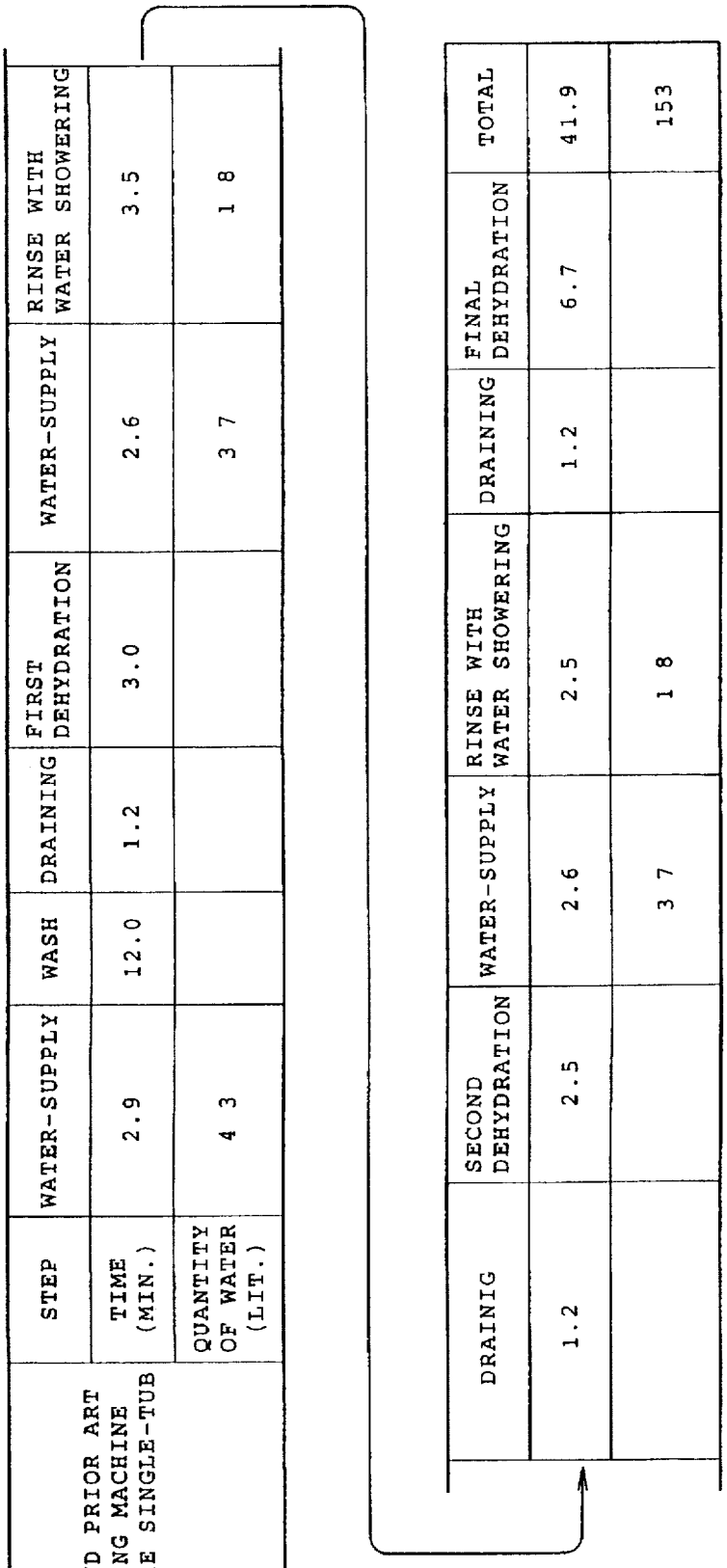

Since the rotatable tub 8 has the dehydrating holes 9 only in the upper end portion of the circumferential wall thereof, almost all the water supplied into the rotatable tub 8 in the rinse-with-dehydration step soaks into the laundry. Consequently, a high level of water soaking efficiency can be achieved, and accordingly, the quantity of water and the period of time required for the rinse-with-dehydration step can be further reduced as compared with the rinse-with-dehydration step executed by the prior art two-tub type full automatic washing machine. More specifically, as obvious from FIGS. 6A–6C, a quantity of water required for the washing is 99 liters in the present embodiment, whereas those of the prior art single tub and two-tub type washing machines are 153 liters and 170 liters respectively. FIGS. 6A–6C also show that a period of time required for the washing is 29.9 minutes in the present embodiment, whereas those of the prior art single tub and two-tub type washing machines are 41.9 minutes and 52.3 minutes.

The rotatable tub 8 swings to some extent during the rinse-with-dehydration step. However, since the outer tub 2 is resiliently suspended on the suspension means 3 together with the rotatable tub 8, the outer tub 2 is moved with the rotatable tub 8. Accordingly, the position of the inner lid 35 or the showering holes 39 thereof relative to the rotatable tub 8 is unchanged. Consequently, the water is usually supplied to predetermined locations in the rotatable tub 8, which results in better soaking of water into the laundry and does not bring about reduction in the effects of the rinse-with-dehydration.

Figure 8:
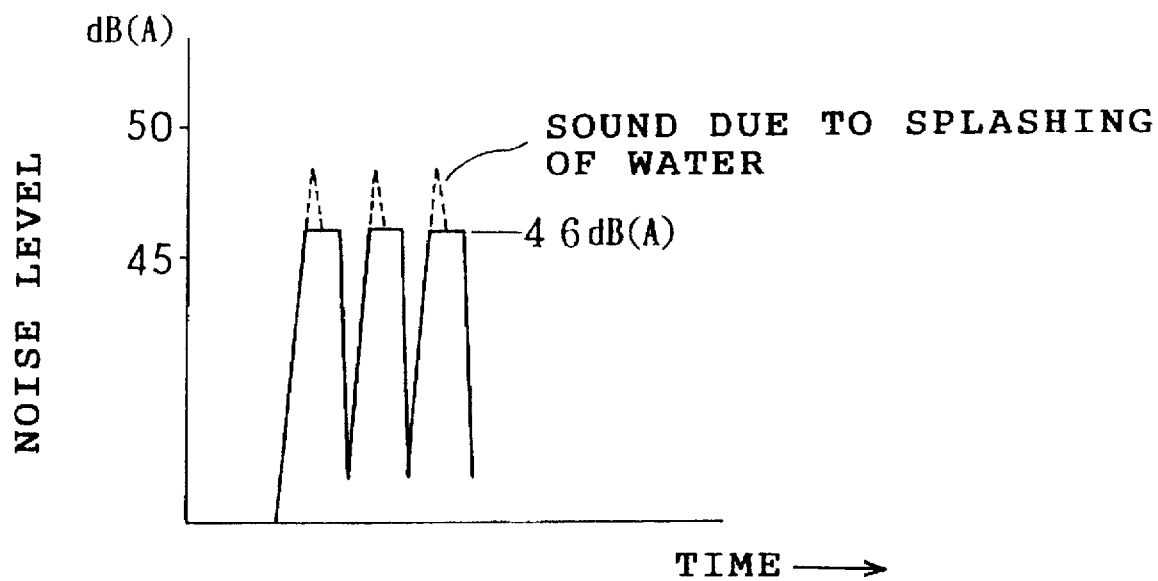
FIG. 8 is a graph showing the noise level.

The mode of the agitation performed by the agitator 33 is intensified as compared with that of the prior art full automatic washing machine. Consequently, the cleaning performance can be improved. More specifically, as obvious from the following TABLE 3, a cleanliness ratio of 0.96 can be obtained from a wash-step time period of 7.7 minutes in the present embodiment, whereas the prior art single tub type washing machine requires a time period of 12.5 minutes to obtain a cleanliness ratio of 0.95, which value is smaller than that of the present embodiment. It is considered that the intense mode of agitating operation by the agitator 33 would cause the water to splash out of the outer tub 2 and produce noise. However, since the inner lid 35 is provided so as to close and open the upper opening of the outer tub 2, the splashing of the water can be prevented and the noise can be reduced. The solid line in FIG. 8 shows a noise produced by the washing machine of the present embodiment and the broken line a noise produced in the case where the inner lid 35 is removed. As obvious from FIG. 8, an offensive noise due to the splashing of the water can be shut up in the present embodiment.

TABLE 3

| | Cleaning performance | |
|---|---|---|
| | Present embodiment | Prior art single tub type |
| Cleanliness ratio | 0.96 | 0.95 |
| Time period of wash step | 7.7 min. | 12.5 min. |

The inner basket 22 disposed in the vicinity of the inner circumferential face of the rotatable tub 8 has the expanding portions 23 expanding outwardly from the circumferential wall thereof and the water-passing holes 24 formed in the circumferential wall thereof. Consequently, the space 25 serving as the water flow path is defined between the inner circumferential surface of the rotatable tub 8 and the outer circumferential surface of the inner basket 22. Consequently, the laundry can be prevented from closely adhering to the inner circumferential face of the rotatable tub 8 during the dehydrating step, which results in improvement of the dehydrating performance as compared with the prior art single tub type washing machine as shown in TABLE 4. Furthermore, since the draining can be smoothly performed, the draining performance can also be improved as compared with the prior art, as obvious from TABLE 5. Additionally, the rotatable tub 8 has a double wall structure as the result of provision of the inner basket 22. The strength of the rotatable tub 8 can be improved, and accordingly, the rotatable tub 8 can sufficiently withstand the high speed rotation in the dehydration step. Consequently, the dehydrating performance can be further improved.

TABLE 4

| | Dehydrating performance | |
|---|---|---|
| | Present embodiment | Prior art single tub type |
| Dehydrating rate (%) | 57.2 | 54.6 | where load is rated or 6 kg, a dehydrating period of time or a motor energizing period of time is 7 minutes, and a rotational speed of the rotatable tub is about 1,000 rpm.

TABLE 5

| | Draining performance | |
|---|---|---|
| | Present embodiment | Prior art single tub type |
| No load (lit./min.) | 30.9 | 30.8 |
| Rated load (lit./min.) | 30.5 | 19.2 |

The diameter of the rotatable tub 8 is gradually increased from the lower end side thereof to the upper end side thereof, which results in further smoothing of the draining. Furthermore, the showering holes 39 are formed in the circumferential rear portion of the inner lid 35. In the rinse-with-dehydration step, the water can be desirably showered onto the laundry which has been pushed against the inner circumferential face of the rotatable tub 8 due to rotation thereof. Consequently, the water soaking efficiency can be further improved, and accordingly, the performance in the rinse-with-dehydration can be improved.

The water supply via the showering holes 39 of the inner lid 35 into the rotatable tub 8 and rotation of the rotatable tub 8 are alternately repeated in the rinse-with-dehydration step. Consequently, a quantity of water used can be further reduced as compared with the case where the water supply is executed even during rotation of the rotatable tub 8.

The outer tub 2 may be constructed so as to also serve as the outer cabinet. The water supply may be continuously executed in the DEHYDRATION WITH WATER SHOWERING and the DEHYDRATION of the rinse-with-dehydration steps.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:
1. An automatic washing machine comprising:
   an outer tub having an upper opening;
   a rotatable tub provided for rotation about a vertical axis in the outer tub and having a circumferential wall formed with a dehydrating hole only in an upper portion thereof so that the rotatable tub is substantially imperforate;
   an agitator provided in the rotatable tub;
   an inner lid provided so as to open and close the upper opening of the outer tub, the inner lid having a showering hole formed in a predetermined portion thereof;
   water-supply means for supplying water to the inner lid so that the water is showered from the showering hole of the inner lid into the rotatable tub; and
   control means for sequentially executing a wash step by driving the agitator under the condition that the inner lid closes the upper opening of the outer tub, and a rinse-with-dehydration step including the supply of water to the inner lid by the water-supply means so that the water is showered into the rotatable tub, and rotation of the rotatable tub so that the water is centrifugally extracted from laundry.

2. An automatic washing machine according to claim 1, further comprising suspension means mounted on a stationary member of the machine for resiliently suspending the outer tub.

3. An automatic washing machine according to claim 2, wherein the agitator performs an intensified mode of agitating operation.

4. An automatic washing machine according to claim 2, further comprising an inner basket formed into a cylindrical shape and disposed in close vicinity of an inner circumferential face of the rotatable tub to be prevented from rotation relative to the rotatable tub, the inner basket having a number of water-passing holes formed in circumferential wall thereof.

5. An automatic washing machine according to claim 2, wherein the diameter of the rotatable tub is larger at an upper end side than at a lower end side thereof.

6. An automatic washing machine according to claim 2, wherein the showering hole is formed in a portion of the inner lid in the vicinity of the circumference of the rotatable tub.

7. An automatic washing machine according to claim 2, wherein the water supply via the showering hole of the inner lid into the rotatable tub and rotation of the rotatable tub are alternately repeated in the rinse-with-dehydration step.

8. An automatic washing machine according to claim 1, wherein the agitator performs an intensified mode of agitating operation.

9. An automatic washing machine according to claim 1, further comprising an inner basket formed into a cylindrical shape and disposed in close vicinity of an inner circumferential face of the rotatable tub to be prevented from rotation relative to the rotatable tub, the inner basket having a number of water-passing holes formed in a circumferential wall thereof.

10. An automatic washing machine according to claim 1, wherein the diameter of the rotatable tub is larger at an upper end side than at a lower end side thereof.

11. An automatic washing machine according to claim 1, wherein the showering hole is formed in a portion of the inner lid in the vicinity of the circumference of the rotatable tub.

12. An automatic washing machine according to claim 1, wherein the water supply via the showering hole of the inner lid into the rotatable tub and rotation of the rotatable tub are alternately repeated in the rinse-with-dehydration step.

* * * * *